INVENTOR.
James Burton Roozee

Dec. 6, 1966 J. B. ROOZEE 3,289,581
INK MONITORING SYSTEM FOR PRINTING PRESSES
Filed May 12, 1964 4 Sheets-Sheet 3

INVENTOR.
James Burton Roozee
BY Hill, Sherman, Meroni, Gross & Simpson
ATTORNEYS

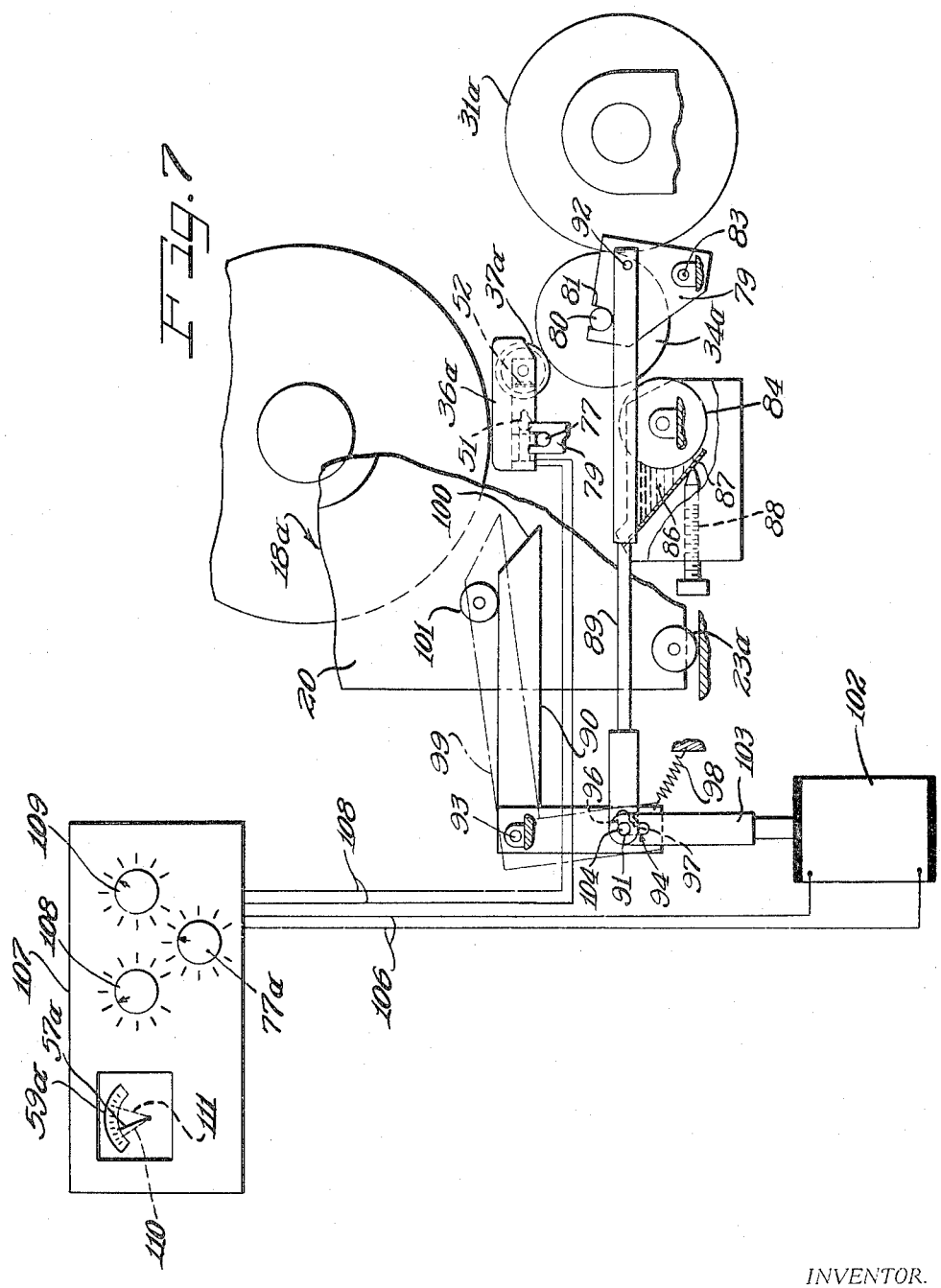

United States Patent Office 3,289,581
Patented Dec. 6, 1966

3,289,581
INK MONITORING SYSTEM FOR PRINTING PRESSES
James Burton Roozee, Arlington Heights, Ill., assignor to Vandercook & Sons, Inc., Chicago, Ill., a corporation of Delaware
Filed May 12, 1964, Ser. No. 366,845
1 Claim. (Cl. 101—269)

This invention relates generally to printing presses and more specifically relates to an ink monitoring system for measuring and for controlling the thickness of a layer of ink applied to the ink rollers of a press.

An important factor involved in the production of quality printed matter is the quantity or thickness of the layer of ink on the printing plate which, in most instances is a function of the thickness of a layer of ink on the ink roller which traverses and actually inks the plate.

For any given set of parameters, such as the composition of the paper or other matter to be printed, the characteristics and composition of the ink used, the type of press and printing plates or forms utilized, the size and composition of the ink roller which inks the printing plate, and so forth, there is generally an optimum thickness of the ink layer which should be deposited on the printing form to provide high quality printing.

Once this optimum thickness is obtained it should be adhered to in order to produce a quantity of high quality printed matter.

In addition, if such optimum thickness is determined on one printing press it follows that the same thickness should be utilized on other similar presses for the same set of parameters.

It is, therefore, an object of the present invention to provide a simple and economical method and apparatus for measuring and for controlling the thickness of a layer of ink applied to the ink roller of a press.

Another object of the present invention is to provide an apparatus for directly measuring the thickness of a layer of ink on an ink roller, with provision for making such measurement while the roll is assembled and operating on the press.

Still another object of the present invention is to provide an ink monitoring system capable of enabling a press operator to duplicate a predetermined thickness of ink on a plurality of presses, or continually on a single press.

And yet another object of the present invention resides in the provision of a method and apparatus for maintaining a predetermined thickness of ink on the ink rollers of a printing press without the necessity of measuring the thickness or light transmitting qualities of the ink deposited on the printed matter and without the disadvantages attendant to such system.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 7 is a schematic diagram of an ink supply control mechanism of the invention.

As shown in the drawings:

Figure 1:
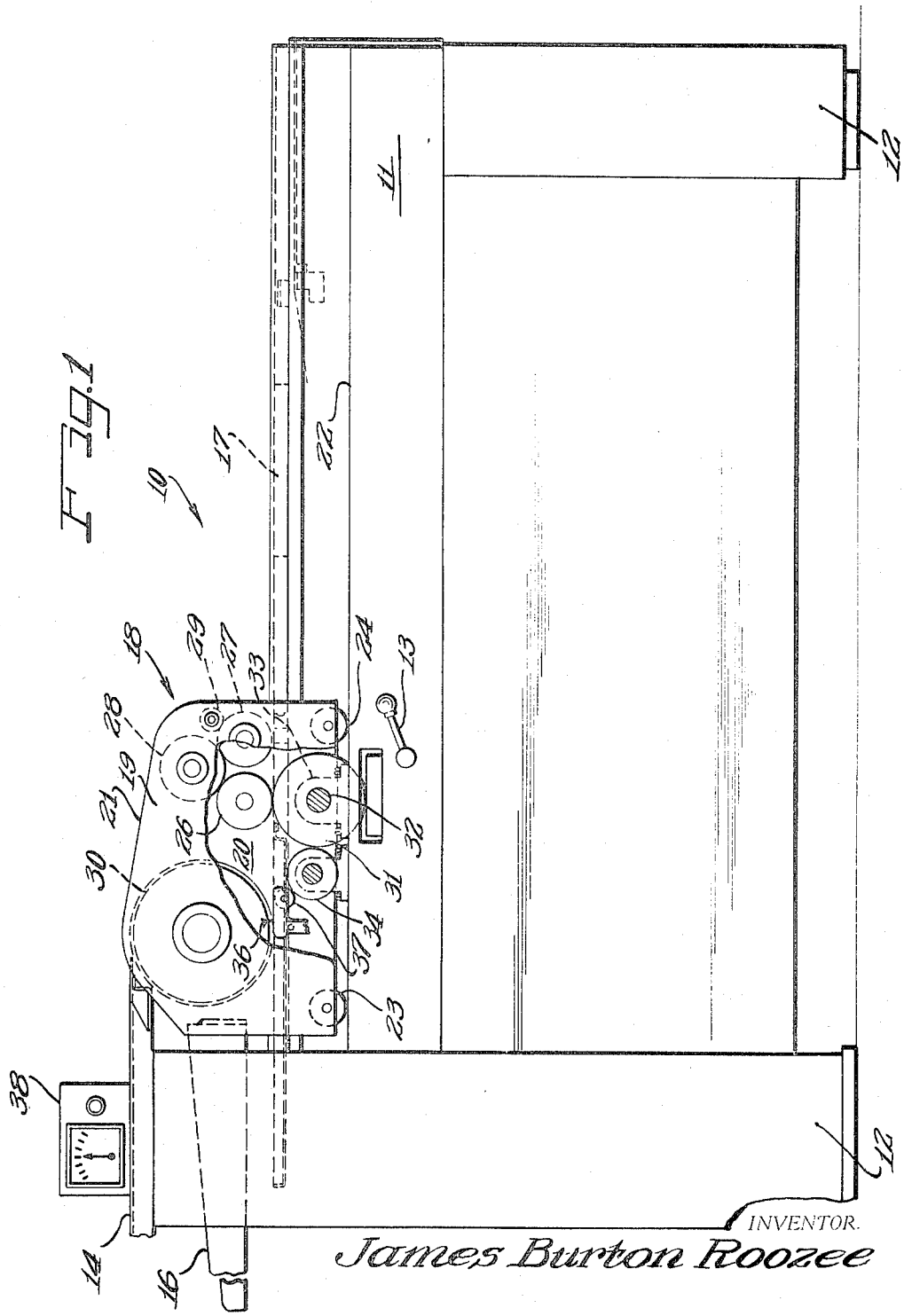
FIGURE 1 is a side elevational view of a complete printing press incorporating the principles of the present invention with portions thereof cut away for clarity.

Although the principles of the present invention are of utility in any printing press a particularly useful application is made to a letter press and an illustrative embodiment herein shown consists of a proof press indicated generally in FIGURE 1 at reference numeral 10.

In general, the press 10, which embodies the principles of the present invention, comprises a horizontal bed 11 which is suitably supported on a plurality of spaced uprights 12. At one end of the bed, referred to as the loading end and represented as the lefthand end of the machine in FIGURE 1, a control lever 13 is provided for controlling the operation of the press, and a feeding table 14 overlies a loading platform 16 for accommodating a stack of sheets to be printed (not shown).

Carried on the bed 11 is a printing plate or form 17 which carries the impression to be printed, and also a carriage 18 which is mounted on the bed for reciprocable movement longitudinally therealong.

The carriage 18 may conveniently comprise a housing having a pair of end walls 19 and 20 joined by a top wall 21 and carried for movement along a track 22 formed on opposite sides of the bed 11 by means of a plurality of rollers as at 23 and 24 rotatably mounted on the end walls 19 and 20 at the lowermost end portions thereof.

The carriage 18 also carries for rotation a plurality of ink rollers utilized as a group to deposit a layer of ink on the form 17, and in the illustrated embodiment such group comprises a pair of spaced rubber-covered form rollers 26 and 27, a vibrator roller 28 which engages both rollers 26 and 27 and an idler roller 29 which engages the form roller 27.

Also carried by the carriage 18 is an impression cylinder 30 about which is wrapped a sheet of paper or other suitable printing material for receiving the impression of the form 17.

It will be noted that the lower peripheral surfaces of the impression cylinder 30 and the form rollers 26 and 27 are on a line with the top surface of the form 17, and in operation the impression cylinder 30 first picks up a sheet of paper from the feeding platform 16 and such sheet is wrapped around the periphery of the cylinder. Then the carriage 18 is moved forwardly longitudinally along the bed 11 on rollers such as at 23 and 24, and as the form rollers 26 and 27 traverse the form 17 a layer of ink is deposited on the impression surface thereof, after which the sheet carried around the cylinder 30 is pressed onto the impression surface of the form 17 to receive the impression formed thereon.

The carriage 18 is thereupon returned to the loading end of the bed 11 where the printed sheet is removed from the cylinder 30 and a fresh sheet is placed on the cylinder.

When the carriage 18 is situated at the loading end of the bed 11, as viewed in FIGURE 1, the form roller 26 engages a larger diameter ink drum 31 mounted for rotation on the bed 11 by means of a shaft 32 journalled in a pair of pillow blocks as at 33.

The ink drum 31 has an outer peripheral surface sufficiently great to store a quantity of ink thereon. In the inking position of the rollers as illustrated in FIGURE 1, the ink drum 31, the form roller 26, the vibrator roller 28, the form roller 27 and the idler roller 29 are all rotatably frictionally engageable, and driven by the ink drum 31 which is powered by suitable motor or means (not shown). After the ink drum 31 and the other rollers have been co-rotatably driven for a given interval of time, the thicknesses of the layers of ink deposited on all of these rollers will become substantially equalized.

A supply of ink, generally in paste form, may be applied to the rollers in any suitable manner, and may be applied, for example, on the idler roll 29 for redistribution over all of the other rollers.

In accordance with the principles of the present invention, a monitoring system is provided for measuring and for controlling the thickness of the layer of ink on the ink drum 31 which, as previously noted, is proportional to the thickness of the layer of ink on the form rollers 26 and 27 after the form rollers have been rotated by the ink drum for a given interval of time. Generally, the monitoring system comprises a rubber-covered transfer roll 34 rotatably engageable with the ink drum 31 and a monitor head 36 including a monitoring roll 37 rotatably mounted on the head 36 and engageable with the transfer roll 34.

As will be appreciated, because of the interengagement of the transfer roll 34 and the monitoring roll 37 with the ink drum 31, the monitoring roll will have applied thereon a layer of ink having a thickness which is proportional to the thickness of the ink layer on the ink drum 31. A measurement of the thickness of such layer on the monitoring roll is indicated on suitable indicating apparatus indicated at reference numeral 38.

Figure 2:
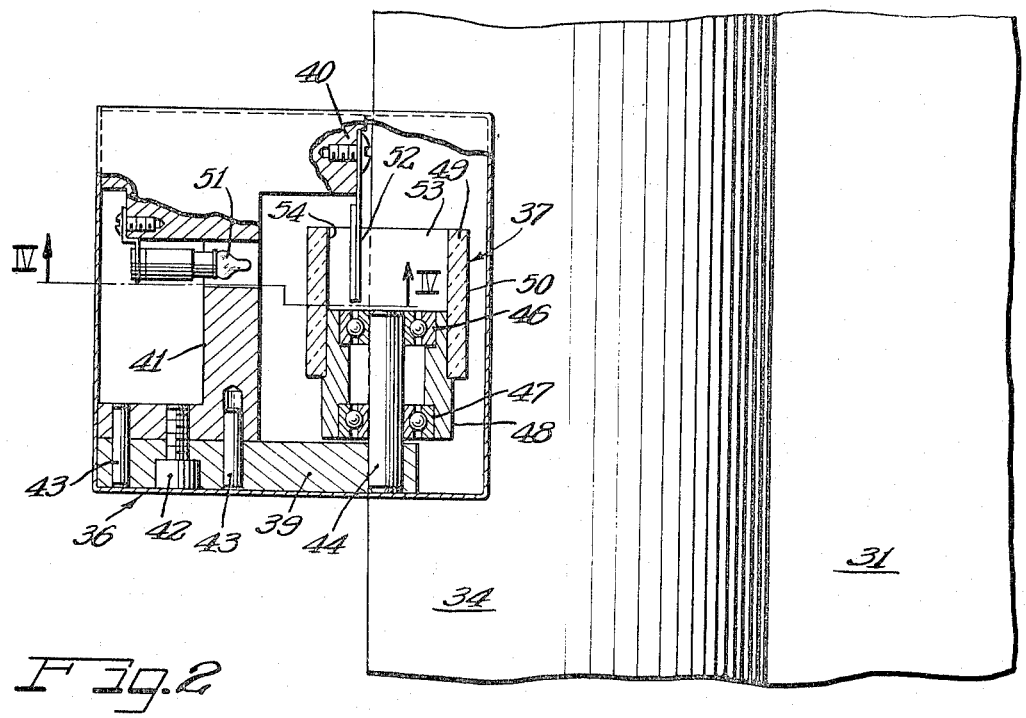
FIGURE 2 is an enlarged fragmentary top view of a pair of rollers of the press of FIGURE 1 with an ink monitor head of the present invention shown partly in section.
Figure 3:
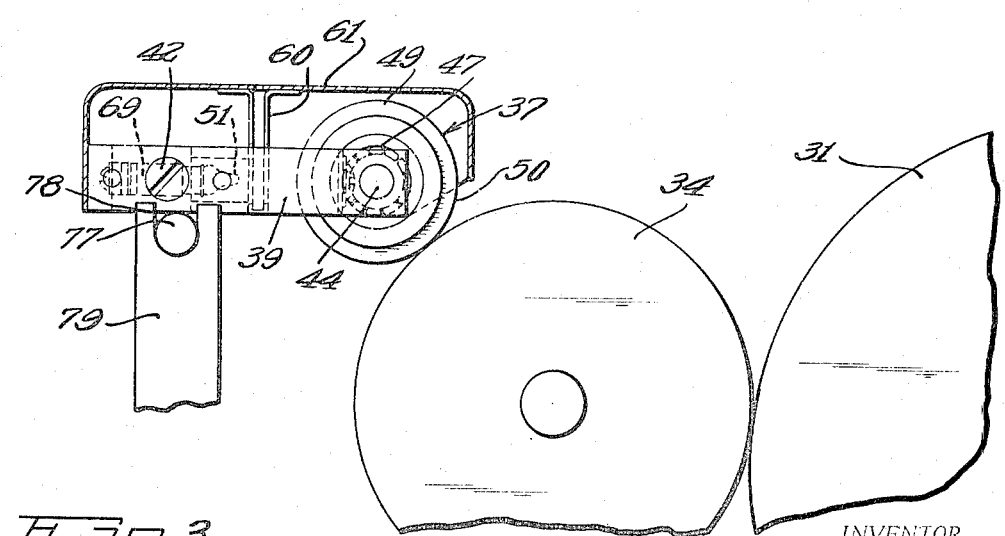
FIGURE 3 is a side elevational view of the arrangement of FIGURE 2 with the housing of the ink monitor head shown in section to disclose the relative disposition of parts.

Referring to FIGURES 2 and 3, the monitor head 36 is more particularly characterized as comprising a pair of end flanges 39 and 40 connected in fixed assembly to a frame member 41 by means of suitable fasteners such as a plurality of threaded screws as at 42 and associated alignment pins as at 43.

The monitoring roll 37 is mounted for rotation on the flange 39 by means of a fixed shaft 44 having an axis extending parallel to the axis of the transfer roll 34 and having mounted thereon a pair of antifriction bearings as at 46 and 47.

The monitoring roll 37 more particularly comprises a hub portion 48 for receiving the outer race of the bearing members 46 and 47, and a hollow cyclindrical wall member 49 having an outer peripheral surface 50 which engages the peripheral surface of the transfer roll 34.

As noted, the thickness of the layer of ink deposited on the peripheral surface 50 of the monitoring roll wall member 49 is proportional to the thickness of the ink layer on the transfer roll 34 and the ink drum 31. In accordance with the invention, such thickness is sensed and measured by means of directing radiant energy waves through the layer of ink deposited on the wall of the monitoring roll, such waves being of the type which vary in intensity in passing through a layer of ink in proportion to the thickness of such layer, and then sensing and measuring the intensity of the waves after they have passed through such ink layer.

Accordingly, a source of radiant energy waves as indicated at 51 is located adjacent the wall member 49 of the monitoring roll 37 and is operative to direct such waves toward said wall member. Also situated adjacent the wall member 49 is a sensing device 52 for sensing the intensity of such waves received thereby, and is situated with respect to the source 51 and the wall member 49 such that such waves which emanate from the source must pass through the layer of ink deposited on the wall member before being received by the sensing device 52.

Although a variety of radiant energy waves may be advantageously utilized in accordance with the principles of the invention, the source 51 in the illustrated embodiment may preferably be of the type which emits waves having a wave length lying in a wave length spectrum between and including the wave lengths of infrared and ultraviolet waves and may more preferably be within the visible spectrum.

Correspondingly, the sensing device 52 may be of a type responsive to the intensity of such waves as, for example, a photoelectric cell of the conventional type which is responsive to wave lengths lying within the wave length spectrum between and including infrared and ultraviolet.

In addition, the material of which the monitoring roll wall member 49 is constituted may vary in accordance with the particular source of radiant energy waves and sensing device utilized as well as the relative disposition of these parts. For example, both the source of the radiant energy waves and the sensing device may be situated on one side of the wall member 49 with the peripheral surface of the wall member coated with suitable reflective material such as chromium to receive the layer of ink and to reflect and transmit the radiant energy waves directed thereon through the ink layer to the sensing device.

Alternatively, the source 51 and the sensing device 52 may be situated on opposite sides of the wall member 49. Referring specifically to the illustrated embodiment, the source 51 comprises an electrically energizable light or lamp situated exteriorly of the monitoring roll 37 and positioned such as to direct visible light waves toward the wall member 49. The sensing device 52 constitutes a conventional photoelectric cell situated interiorly of the monitoring roll 37 in a cylindrical cavity 53 formed therein.

The wall member 49 in the illustrated embodiment comprises a translucent or transparent material such as glass with the peripheral surface 50 thereof, as well as an interior surface 54 thereof, highly polished to ensure consistency in the thickness of the wall member 49 and accuracy in measurement.

Figure 5:
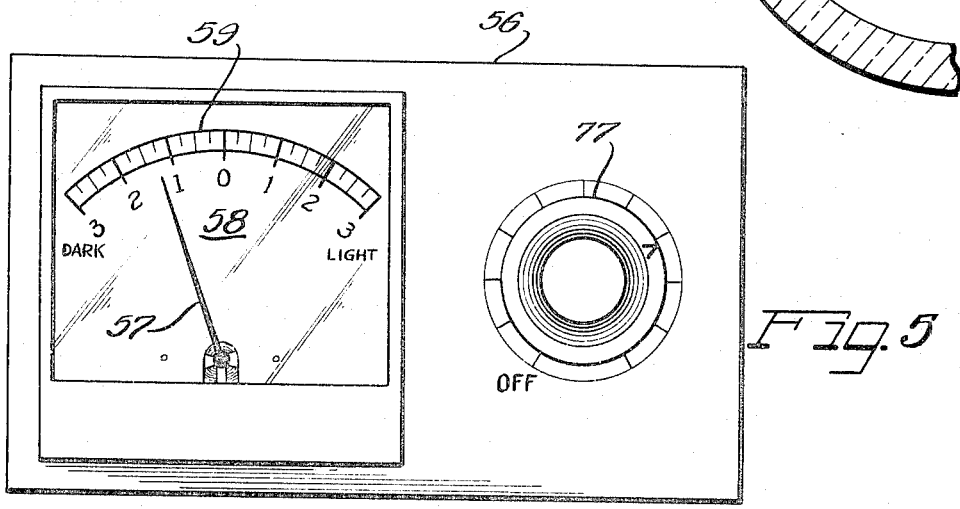
FIGURE 5 is a front elevational view of an indicating mechanism incorporated in the invention.

In order to measure the intensity of the light waves transmitted through the wall member 49 and the layer of ink deposited thereon, suitable indicating means may be connected to the photoelectric cell 52 which, in the illustrated embodiment, comprises a microamp meter as shown at 56 in FIGURE 5 and includes a pivotally mounted pointer 57 which is arranged to pivot across a back plate 58 having suitable indicia such as a graduated scale marked thereon as at 59. The scale 59 includes a zone marked "Dark," to which the pointer 57 is pivoted when the photoelectric cell 52 is subjected to waves of relatively low intensity as a result of a relatively thick layer of ink deposited on the wall member 49, and also includes a zone marked "Light" to which the pointer rotates when the photoelectric cell is subjected to waves of relatively high intensity as a result of a relatively thin layer of ink on the wall member 49.

Assuming, for example, that the monitoring roll 37 was initially coated with a relatively thick layer of ink, the intensity of the light waves transmitted to the photo cell 52 would be relatively low, and the pointer 57 would indicate in the "Dark" zone of the scale 59. Subsequent use of the press 10 to produce printed matter, assuming that no additional ink was added to the ink rolls, would necessarily decrease the thickness of the layer of ink on the monitoring roll 37, and the pointer 57 would thereupon gradually pivot toward the "Light" zone of the meter scale, thereby providing a visual indication of the thickness of the ink layer on the ink rollers while the press 10 is operating.

In order to provide a standard or base of measurement in sensing and measuring the thickness of the ink layer on the ink rolls, and to provide a method for maintaining a consistent predetermined thickness of such ink layer over an extended period of operation on a single press as well as on a plurality of presses, the present invention contemplates the provision of a standard of reference in establishing as well as in calibrating light intensity as well as meter readings.

Figure 4:
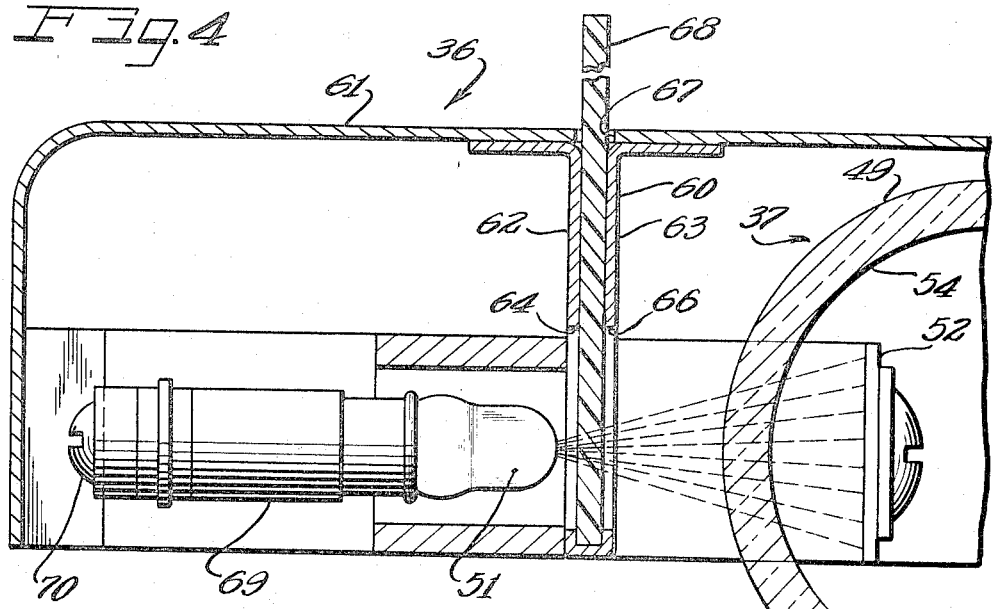
FIGURE 4 is an enlarged fragmentary sectional side view of the ink monitor head taken substantially along line IV—IV of FIGURE 2.

Thus, in FIGURE 4 the monitor head 36 is shown as comprising a bracket 60 rigidly affixed to a top wall 61 of the monitor head or frame and includes a pair of enclosure walls 62 and 63 which extend downwardly in interposition between the lamp 51 and the monitoring roll 37. The enclosure walls 62 and 63 are apertured at 64 and 66 directly in front of the lamp to provide a window or unobstructed path between the lamp 51 and the monitoring roll 37.

A slot 67 is formed in the top wall 61 in alignment with the bracket 60 to accommodate insertion of a test material 68 into the bracket to lodge between the lamp 51 and the monitoring roll 37.

The test material 68 is made of translucent material having the property of substantially diminishing the intensity of radiant energy waves such as light waves transmitted therethrough. For example, the test material 68 may comprise conventional photographic film material exposed to provide predetermined light transmitting qualities. It will be appreciated that other materials having known radiant energy wave transmitting characteristics can also be effectively utilized.

The lamp 51 is mounted in a socket 69 which in turn is fixedly connected to the monitor head 36 by means of a suitable fastener such as a threaded screw 70. The lamp 51 is of the type adapted to operate over a wide power range so as to emit light waves of selectivity variable intensity.

Figure 6:
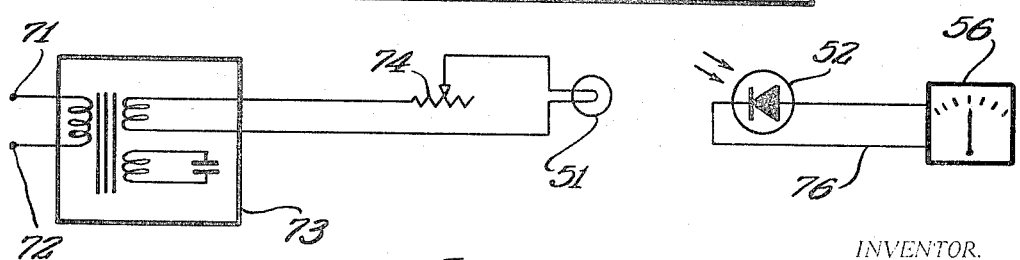
FIGURE 6 is a schematic electrical wiring diagram of the present invention.

Referring to FIGURE 6, the lamp 51 is connected to a pair of electric contacts 71 and 72 adapted for connection to a suitable source of electric power. Interposed between the contacts and the lamp is a constant voltage transformer 73 (for maintaining a substantially constant voltage regardless of minor changes in line voltage) and a variable resistor indicated schematically at 74. The photoelectric cell 52 is, of course, connected to the microamp meter 56 by suitable circuit means as indicated at 76.

The variable resistor 74 includes a manually adjustable control member which, in the illustrated embodiment, comprises a knob 77 mounted on the meter 56 as shown in FIGURE 5. The intensity of the light emitted from the lamp 51 can therefore be selectively controlled by manual adjustment of the resistor knob 77.

In order to provide a predetermined "standardized" intensity of the light emitted from the lamp 51, the test material 68 is interposed between the lamp 62 and the photoelectric cell 63 before any ink whatsoever is applied to the monitoring roll 37. The adjustment knob 77 is thereupon adjusted until the pointer 57 of the meter 56 indicates a predetermined reading, such as "0." It will be appreciated that through the utilization of a monitoring roll constituted of material such as glass, having known properties of light transmission, and of standardized test material providing a predetermined reduction in intensity of light transmitted therethrough, a standard of reference may be provided for the monitoring system of a single press, or for a plurality of presses using similar monitoring systems.

In operation, after the light intensity of the lamp 51 has been established at the zero mark or other predetermined mark on the scale 59, a supply of ink is then applied to the ink drum 31 until a predetermined optimum thickness of a layer of ink (which has been found acceptable to provide high quality printing with the aforementioned parameters) has been applied to the monitoring roll 37 as indicated by the attainment of a predetermined reading on the scale 59.

Assuming that ink is being applied to the ink drum 31 manually, the press 10 is operated without a fresh supply of ink as long as the pointer 57 of the meter 56 remains within a predetermined range of the scale 59 which results in high quality printing. As the pointer moves from this acceptable range, a fresh supply of ink can be manually applied to the ink rollers until once again the pointer 57 moves back into such "acceptable" range.

As best seen in FIGURE 3, the monitor head 36 comprises a shaft 77 connected in fixed assembly thereto and received in a groove 78 formed in a pair of support members as at 79 situated on opposite sides of the monitor head 36 and mounted in any convenient manner to the press bed 11. The shaft 77 is positioned with respect to the monitor head such that the monitoring roll 37 will, by means of gravity, pivot toward and frictionally engage the periphery of the transfer roll 34. As a result the monitoring roll 37 is urged against the roll 46 with a constant force. In addition, such unrestricted pivotal movement of the monitoring roll 37 protects the glass wall member 60 thereof in the event that foreign matter should pass between the contact portions of the rolls 31 and 37.

Further in accordance with the principles of the invention, automatic ink supply means may be provided for maintaining a layer of ink of predetermined thickness on the ink rolls of the press 10.

Accordingly, in the schematic view of FIGURE 7, wherein parts similar to those in other figures are given like reference numerals with the suffix "a" added, an automatic ink supply mechanism the rubber-covered transfer roll 34a includes a shaft 80 which is rotatably mounted in a groove 81 formed in a guide plate 82. The guide plate 82 is mounted for pivotal movement on a fixed shaft 83 whereby the transfer roll 34a can be pivoted to rotatably engage the surface of the ink roll 31a or the surface of a conventional fountain roll 84.

The fountain roll 84 is provided with a supply of ink indicated at 86 which is received in an ink reservoir defined by the descending side of the fountain roll 84 and a wiper blade 87 which is maintained in spaced relation to the periphery of the fountain roll 84 by means of an adjustment screw 88.

In order to control the movement of the transfer roll 34a a movable linkage mechanism is connected to the guide plate 82 and comprises a linkage arm 89 connected to an actuating lever 90 by means of a pin 91.

Linkage arm 89 is pivotally connected to the guide plate 79 by means of a pin 92 and the lever arm 90 is pivotally mounted on a fixed fulcrum or pin 93, which may be mounted on the press bed 11 in any suitable manner.

The pin 91 is connected in fixed assembly to the linkage arm 89 and is received in an L shaped slot or groove 94 formed in the lever arm 90 and comprising a generally horizontally extending portion 96 and a vertically extending portion 97.

The lever arm 90 is constantly biased by a coil spring 98 to a position shown in dashed lines at 99, and includes an inclined ramp or cam surafce 100 situated with respect to a wheel or roller 101 rotatably mounted on the movable carriage 18a such as to be engaged thereby to pivot the lever arm 90 to a position shown in solid lines when the carriage 18a is moved to the loading end of the press 10.

It will be appreciated that when the pin 91 interconnecting the lever arm 90 and the linkage arm 89 is situated with respect to the groove 94 such as to be in alignment with the horizontal portion 96 thereof, pivotal or "rocking" movement of the lever arm 90 will have no effect upon the linkage arm 89 and the transfer roll 34a. However, if the pin 91 is moved down into the vertical portion 97 of the groove 94, pivotal movement of the lever arm will effect movement of the transfer roll 34a between the ink drum 31a and the fountain roll 84.

In order to move the pin 91, and correspondingly the transfer roll 34a, as a function of the thickness of the layer of ink on the ink drum 31a and the monitoring roll 37a, a push-type solenoid 102 comprises a telescopically extensible actuating arm 103 which moves in response to energization of the solenoid 102 and which has formed therethrough a bore 104 for fixedly receiving the pin 91.

The solenoid 102 is electrically connected by suitable circuitry 106 to a combination meter-relay 107, which is similar in most respects to the meter 56 of FIGURE 5 and which is also connected by circuitry as at 108 to the photoelectric cell of the monitor head 36a. The meter-relay 107 is of a conventional construction and includes an amplifier and a pair of current-actuated relays (not shown) having contacts selectively positionable along the arc of an adjustment scale 59a by means of a pair of control knobs 108 and 109 which also actuate, respectively, a pair of control setting pointers 110 and 111.

Thus, by means of the control knobs 108 and 109 and the contacts and relays controlled thereby (not shown) an "acceptable" range on the scale 59a may be established, such that when the pointer 57a, which moves in response to the thickness of the ink layer on the monitoring roll 37a, is situated within such predetermined ranges the solenoid 102 is energized, thus moving the pin 91 to the position illustrated in FIGURE 7 and rendering movement of the lever arm 90 ineffectual in moving the transfer roll 34a.

However, as the pointer moves out of the range defined by the control setting pointers 110 and 111, the solenoid 102 will be de-energized. Such de-energization of the solenoid 102 will cause the pivotal movement of the lever arm 90 to move the transfer roll 34a from the fountain roll 84 to the ink drum 31a each time the carriage 18a moves away from and back to the loading end of the press 10, until the pointer 57a once again is positioned between the range defined by the control setting pointers 110 and 111.

Although minor modifications might be suggested by those versed in the art, it should be understood that I wish to embody within the scope of the patent warranted hereon all such modifications as reasonably come within the scope of my contribution to the art.

I claim as my invention:

A printing press comprising,
  a horizontal bed,
  a carriage mounted on said bed for reciprocal movement longitudinally therealong between opposite ends of the bed,
  an ink drum and a fountain roll having a supply of ink thereon rotatably mounted on fixed spaced parallel axes on said bed at one end thereof,
  means for rotating said ink drum and said fountain roll,
  a transfer roll mounted on said bed between said fountain roll and said ink drum for pivotal movement therebetween and for alternate ink transfer engagement therewith for depositing a layer of ink on said ink drum,
  a longitudinal linkage arm connected to said transfer roll,
    said linkage arm being movable reciprocally in a longitudinal direction for pivoting said transfer roll back and forth between said fountain roll and said ink drum and being swingable in a longitudinally transverse direction between first and second positions thereof,
  actuating lever means mounted on said bed and operatively engageable with said carriage and said linkage arm and effective when said linkage arm is in said first swingable position thereof to pivot said transfer roll from said ink drum to said fountain roll when said carriage is moved to said one end of said bed and to pivot said transfer roll from said fountain roll to said ink drum when said carriage is moved to the other end of said bed,
    said actuating lever means being effective when said linkage arm is in said second swingable position thereof to maintain said transfer roll in engagement with said ink drum when said carriage is moved to either end of said bed,
  an electric solenoid for moving said linkage arm between said first and second swingable positions thereof upon energization and de-energization of said solenoid, respectively, and
  ink monitoring means for energizing and de-energizing said solenoid as a function of the thickness of the layer of ink on said transfer roll comprising,
    a hollow translucent monitoring roll having a cylindrical wall engaging said transfer roll for corotation therewith whereby the layer of ink on said monitoring roll is proportional to the layer of ink on said transfer roll,
    an electric lamp situated outside of said monitoring roll for directing light through the wall thereof and the ink deposited thereon, and circuit means comprising a photo cell situated within said monitoring roll to sense the intensity of light transmitted through said wall and a relay interconnecting said photocell and said solenoid for energizing and de-energizing said solenoid as a function of the intensity of the light being received by said photocell.

References Cited by the Examiner

UNITED STATES PATENTS

| | | | |
|---|---|---|---|
| 2,726,173 | 12/1955 | Martin | 118—9 X |
| 2,773,412 | 12/1956 | Huck | 118—9 X |
| 2,797,171 | 6/1957 | Fralish | 118—9 X |
| 2,951,416 | 9/1960 | Shinn | 118—9 X |
| 2,972,925 | 2/1961 | Armbrecht et al. | 88—142 |
| 2,998,767 | 9/1961 | Vandercook et al. | 101—269 |
| 3,008,369 | 11/1961 | Zuk | 88—142 |
| 3,076,723 | 1/1963 | Couington | 118—9 X |

ROBERT E. PULFREY, *Primary Examiner.*

J. R. FISHER, *Assistant Examiner.*